United States Patent
Ellwood, Jr.

(10) Patent No.: US 9,584,778 B2
(45) Date of Patent: Feb. 28, 2017

(54) HYBRID TELECOM NETWORK-STRUCTURED ARCHITECTURE AND SYSTEM FOR DIGITAL IMAGE DISTRIBUTION, DISPLAY AND PROJECTION

(76) Inventor: Sutherland C. Ellwood, Jr., Clinton Corners, NY (US)

(*) Notice: Subject to any disclaimer, the term of this patent is extended or adjusted under 35 U.S.C. 154(b) by 739 days.

(21) Appl. No.: 12/371,461

(22) Filed: Feb. 13, 2009

(65) Prior Publication Data

US 2009/0231358 A1 Sep. 17, 2009

Related U.S. Application Data

(60) Provisional application No. 61/028,887, filed on Feb. 14, 2008.

(51) Int. Cl.
*H04N 9/31* (2006.01)
*G03B 21/00* (2006.01)

(52) U.S. Cl.
CPC ......... *H04N 9/3147* (2013.01); *G03B 21/005* (2013.01)

(58) Field of Classification Search
CPC .................. G03B 21/005; H04N 9/3147
See application file for complete search history.

(56) References Cited

U.S. PATENT DOCUMENTS

| | | | | |
|---|---|---|---|---|
| 4,101,188 A | * | 7/1978 | Yevick | 385/119 |
| 5,053,765 A | * | 10/1991 | Sonehara et al. | 340/815.43 |
| 5,647,036 A | * | 7/1997 | Deacon et al. | 385/27 |
| 7,088,321 B1 | * | 8/2006 | Parker | G09G 3/3406 345/211 |
| 7,177,509 B2 | * | 2/2007 | Ko | 385/115 |
| 2003/0142040 A1 | | 7/2003 | Gaydoul et al. | |
| 2006/0056794 A1 | * | 3/2006 | Ellwood, Jr. | 385/147 |
| 2007/0139768 A1 | | 6/2007 | Tsai et al. | |

FOREIGN PATENT DOCUMENTS

| | | |
|---|---|---|
| JP | 1988304290 | 12/1988 |
| JP | 1994250029 | 9/1994 |
| JP | 2001134202 A | 5/2001 |
| JP | 2002107553 A | 4/2002 |
| JP | 2005338250 A | 12/2005 |
| JP | 2007193234 A | 8/2007 |
| JP | 2008292576 A | 12/2008 |
| WO | 2009103083 A1 | 8/2009 |

* cited by examiner

*Primary Examiner* — Omar R Rojas
(74) *Attorney, Agent, or Firm* — Patent Law Offices of Michael E. Woods; Michael E. Woods

(57) ABSTRACT

A hybrid and telecom-structured image display and projection system implementing a desired image display and projection solution that is fast, cheap to manufacture, low-power, light-weight, scalable in size and resolution, fast-switching and capable of a broad range of mode characteristics of light for implementing dimensional display and projection, flexible, rigid-flat, or rigid-conformal as needed.

2 Claims, 8 Drawing Sheets

Fig. 2
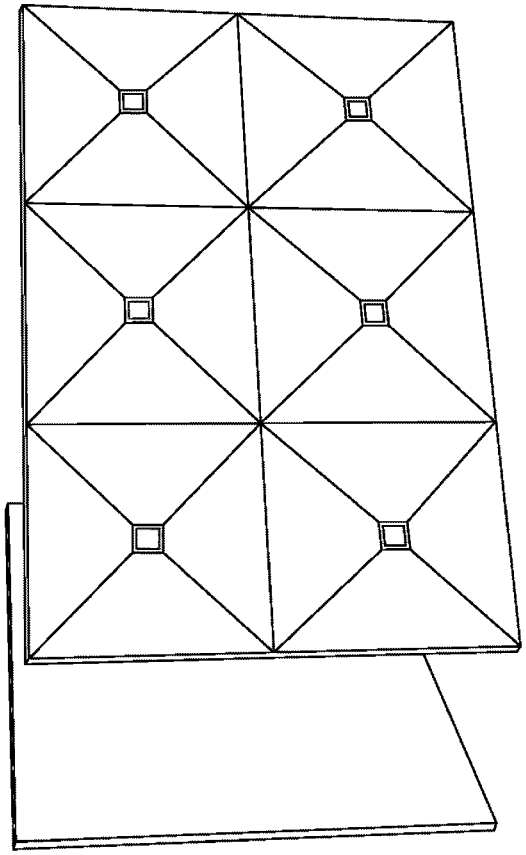
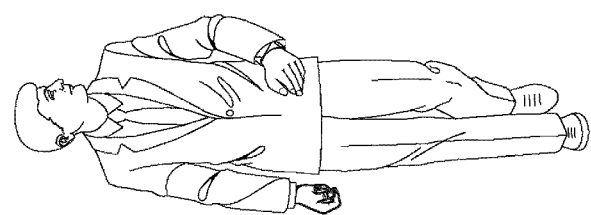

HYBRID TELECOM NETWORK-STRUCTURED ARCHITECTURE AND SYSTEM FOR DIGITAL IMAGE
DISTRIBUTION, DISPLAY AND
PROJECTION

CROSS REFERENCE TO RELATED
APPLICATIONS

This application claims benefit of U.S. Application No. 61/028,887.

BACKGROUND OF THE INVENTION

The present invention relates generally to displays and projectors and more specifically to an image display and projection technology that transcends limitations of mono-technologies and use the strengths of best-in-breed methods for each desired image display and projection characteristic.

In the field of image display and projection technologies limitations have been revealed in all existing mono-technologies which prevent them from implementing the next generation of hi-speed, low cost, low power, flexible, wearable, and dimensional display forms.

A shared limitation arises from the general reliance on a single pixel-switching component technology to implement the entire image-generation architecture, as typically any one pixel-switching component technology, whether a liquid crystal (LC) cell or gas plasma cell, a digital micro-mirror device (DMD), a magneto-optic (MO) switch, or an organic light emitting diode (OLED), excels in one or more but not all aspects of desired image display functionality.

There is currently no unitary image generation technology that is optimized for all image display characteristics.

For instance, LC has advantages in scaling of the image-array size and image resolution size, so that it can be manufactured in sizes ranging from 100 inch panels to a 4000×2000 line liquid crystal on silicon array that is a few centimeters a side. But LC is heat intolerant and relatively color-band unstable, requires a complex and rigid substrate structure, and is relatively slow-switching (even the fastest, ferroelectric liquid crystal on silicon (FLCoS), is slower than a DMD)—too slow to support optimal dimensional image generation (including stereoscopic and holographic).

DMD, on the other hand, along with other MEMS image array and spatial-light modulator technologies, face yield problems in resolution sizes greater than hi-definition television (2 k×1 k lines of resolution) or the DCI 2 k×1 k standard. And, while being relatively more color-stable than LC's, DMD's are relatively heat-intolerant, and while faster-switching than LC, are still not fast enough to support comfortable, bright dimensional display and projection images. More importantly, DMD (or Gradient Light Valve™ or Qualcomm Display's IMOD) technologies do not scale much beyond computer chip or handheld display array sizes, due to yield limitations and limitations on upscaling the pixel switch size to the larger pixel dimensions required for larger area displays.

Gas Plasma, another dominant display type, has limitations in yield, and can only be cost-effectively manufactured at sizes between about 40" and 80". Switching speed also limits its utility for desired dimensional display solutions.

OLED, assuming that materials' lifetimes in the blue range can be extended, excels in brightness and consumes less power as compared to the dominant LC technology. However, it also has limitations in switching speed that prevent it from supporting dimensional display and projection, and faces display-size scaling and yield limitations. Currently, and perhaps inherent in the technology, OLED is applicable to sizes ranging from handheld displays to about 30" displays. OLED has the potential for fabrication on flexible substrates, but the other limitations will be expected to apply here as well. Life expectancy of less than 1000 hours and low yields can make expensive large area displays impractical.

EInk and other electrostatic image generation means are optimized for fabrication on flexible substrates, but face great limitations for acceptable color reproduction, size of the display and switching speed for dimensional display solutions.

Magneto-optic display technology, while excelling at switching speed and being relatively heat-tolerant and band-output stable, has current limitations in efficient switching at visible wavelengths for color displays, with green and blue being severely limited in net optical output. Current thin film fabrication technologies, such as LPE or RFM sputtering, being used as the basis of MO displays also pose limitations in scaling MO displays beyond computer chip or handheld display dimensions.

Given the limitations of these and other image display and projection technologies, in which integration of all pixel functionality is implemented in a single component technology type and often a single modulation material and structure type, what is needed is an image display and projection technology that can transcend the limitations of the mono-technologies in use today, and utilize the strengths of best-in-breed methods for each desired image display and projection characteristic.

BRIEF SUMMARY OF THE INVENTION

The present invention discloses an image display and projection technology that transcends limitations of mono-technologies in use today, and uses the strengths of best-in-breed methods for each desired image display and projection characteristic.

Such a solution architecture and hardware technology is provided by a hybrid and telecom-structured approach to implementing desired image display and projection solutions that are fast, cheap to manufacture, low-power, light-weight, scalable in size and resolution, fast-switching and capable of a broad range of mode characteristics of light for implementing dimensional display and projection, flexible, rigid-flat, or rigid-conformal as needed.

A degree of hybridization in some display technology solutions does exist now, at the time of the present disclosure, but to a limited extent, and it is not a deliberate strategy nor generalized solution to achieve optimal image display and projection characteristics. These examples known to the art, though, are only possible because of a hybridized approach to pixel modulation, and one of them owes its long history of success to its hybrid nature.

The two closely related examples, both well-known to the art, include the cathode rate tube (CRT) display and the current generation of field-emission displays (FED) based on carbon nanotubes as electron emitters (NEDs, including SED). The hybrid structure of this family of display types becomes clear upon inspection of the two-stage process of generating an individual pixel (or R, G, B subpixel).

In the first stage, a switching system (either a beam-steered electron gun in a CRT or an individually-addressed nanotube electron emitter in an array) outputs electrons, and is not modulating light directly—that happens in the second stage. In the second stage of achieving pixel output, pixel-local generation of light is achieved by electron-stimulation of R, G, and B phosphors.

Without the two-stage process, the CRT and FED/NED simply would not be possible.

But a multi-stage, multi-component approach to implementing image display and projection generally runs counter to the philosophy in display technology today to implement complete pixel modulation functionality in a single unitary method or component. A hybrid approach is generally considered inelegant or "kludgy."

The present invention contemplates a division of labor approach, as different materials and structures, whether implemented for image display or photonic integrated circuits, do exhibit different relative strengths and advantages. At any given time, for a particular application, there will an optimal combination of approaches and components. Preferred embodiments of the present invention provide a system solution that integrates these functionalities most effectively.

BRIEF DESCRIPTION OF THE DRAWINGS

FIG. 2 is a block diagram of a very thin, scalable direct-view display;

DETAILED DESCRIPTION OF THE INVENTION

Figure 1:
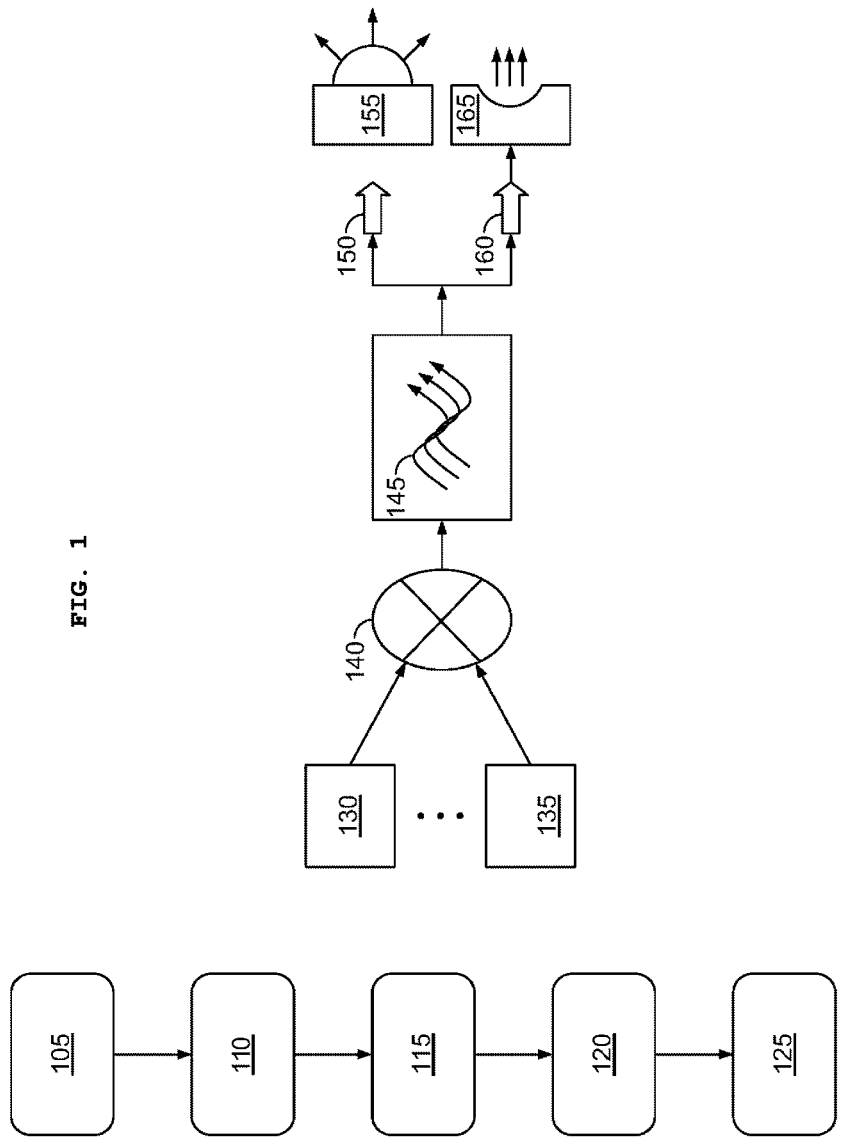
FIG. 1 is a general structural plan and process flow diagram of a hybrid telecom-network structured image display and projection system.

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein. Preferred embodiments of the present invention include an image display and an image projector using hybrid merged technologies.

Specifically, preferred embodiments of the present invention include a combination of fiberoptics, with either passive fiberoptic or fiber-device components, individually and in solid fiberoptic textile-matte optical transport structures, with image-generation components to implement signal aggregation (sometimes referred to herein as superposition), frame allocation between components of increased net frame-rates, mode-segregation to support dimensional displays (color band or polarization mode, and the like), and decouple the scale of the image generation components (modulation stage) from the scale of the image output optics (display size).

Embodiments of the present invention contemplate that formation of a human perceptible image from a large set of signal generating structures includes the following model: an image engine includes a plurality of display image primitive precursors (DIPPs) that are appropriately operated and modulated to generate a plurality of image constituent signals (an individual image constituent signal from each DIPP). These image constituent signals are processed to form a display image primitive (such as image constituent signals occupying the same space and cross-sectional area of the display image primitive on final output) that will form the display image when perceived by the human visual system (HVS). The HVS reconstructs the display image from the display image primitives when presented in a suitable format, such as in an array on a display or a projected image. This is the familiar phenomenon of the HVS perceiving an image from an array of differently colored or grey-scales shadings of small shapes (such as "dots") that are sufficiently small in relation to the distance to the viewer (and HVS). A display image primitive precursor will thus correspond to a structure that is commonly referred to as a pixel when referencing a device producing an image constituent signal from a non-composite color system and will thus correspond to a structure that is commonly referred to as a sub-pixel when referencing a device producing an image constituent signal from a composite color system. Many familiar systems employ composite color systems such as RGB image constituent signals, one image constituent signal from each RGB element (e.g., an LCD cell or the like). Unfortunately, the term pixel and sub-pixel are used in an imaging system to refer to many different concepts—such as a hardware LCD cell (a sub-pixel), the light emitted from the cell (a sub-pixel), and the signal as it is perceived by the HVS (a sub-pixel by typically such sub-pixels have been blended together and are configured to be imperceptible to the user under a set of conditions intended for viewing). The present invention distinguishes between these "pixels or sub-pixels" and therefore a different terminology is adopted to refer to these different constituent elements.

Broadly, embodiments of the present invention may include an image generation stage coupled to a primitive generating system. The image generation stage includes a number N of display image primitive precursors. Each of the display image primitive precursors generate an image constituent signal. These image constituent signals are input into the primitive generating system. The primitive generating system includes an input stage having M number of input channels. An input of an input channel receives an image constituent signal from a single display image primitive precursor. Each input channel has an input and an output, each input channel directing its single image constituent signal from its input to its output, there being M number of inputs and M number of outputs of the input stage. The primitive generating stage also includes a distribution stage having P number of distribution channels, each distribution channel including an input and an output. Generally M=N and P can vary depending upon the implementation. For some embodiments, P is less than N, for example, P=N/2. In those embodiments, each input of a distribution channel is coupled to a unique pair of outputs from the input channels. For some embodiments, P is greater than N, for example P=N*2. In those embodiments, each output of an input channel is coupled to a unique pair of inputs of the distribution channels. Thus the primitive generating system scales the image constituent signals from the display image primitive precursors—in some cases multiple image constituent signals are combined, as signals, in the distribution channels and other times a single image constituent signal is divided and presented into multiple distribution channels.

In this generalized system, the hybridization separates the image generation stage and componentry from the image scaling (larger or smaller) stage and componentry (primitive generating stage), so that the dimensions of the image generation "pixel" (also referred to herein as a display image primitive precursor or DIPP) may be vastly different from the output "pixel," (sometimes referred to herein as the display image primitive or DIP) and so that each pixel (DIP) may aggregate "signal" from multiple source devices (DIPPs), both for any given frame, as well as different sources for different frames in a given second.

In other words, there is no longer a 1:1 relationship between image engine and viewable display output surface, or a 1:1 ratio between switch dimension or number of switches and the dimension or number of output pixels (DIPs). There is instead a many-to-one or a one to many relationship between pixel optics and pixel modulation components.

This architecture, which then either "scales up" from pixel modulator dimension to pixel output dimensions (for example, small image chip>>big display) or "scales down" from pixel modulator dimension to pixel output dimension (projector systems, larger image array or multiple image arrays integrated and then scaled down to output optics to match projector lens dimensions).

Overall, the flexibility of this conceptual approach is extensive—a division of labor between optimized components makes use of best-in-breed (cheaper and/or better) image generation components and technologies in an architecture somewhat similar to a telecommunications network, but packaged very compactly (small projector box, very thin and flexible flat panel, lightweight and flexible handheld, lightweight view-through display glasses).

Important Components of the Hybrid Telecom-Structured Image Display and Projection System Image generator components, either integrated RGB or individual monochrome (DIPPs). These include chips, panels, or discrete devices in an assembled structure. They may themselves have a unitary or multi-stage/hybrid structure. In some applications, telecom signal modulator components of the type used in very large integrated or discrete arrays, may be used though they are not otherwise practical for displays. Significant cost benefit of the system includes use of inexpensive image generator components, and multiple image engines per pixel (DIP) for hi-resolution, large bright displays and projectors.

Pixel Integration Optics and Signal Aggregation/Dispersion via Physical Transposition of Fiberoptic Channels: Solid state fiberoptic textile-matte fabricated optics structures are fabricated to implement a cross-over spatial transform of fiberoptic "channels" from matching pixels (DIPPs) from separate arrays, so that light output can be aggregated from multiple sources, via sorted fiberoptics, for one or more of the following: increased light per pixel (DIP) when "on", more frames per second than an individual image component (DIPP) can support (division of labor of frames-per-second between multiple image generators, e.g., three devices each generate ⅓ of the unique frames required per second), and simultaneous transmission of left eye/right eye "signal" from multiple engines (color band separated, polarization mode separated, and the like.)

Pixel Scaling Optics (up/down). While multiple channels can be integrated to provide output for a single final pixel (DIP), an additional stage and componentry is required to enable usage of image generators whose dimension is optimized (cost, performance) for a one size, while the final output dimension is needed and optimal for another size (smaller, as in a likely projector implementation, or larger, as in a thin display panel driven by a smaller image engine(s).

FIG. 1 is a general structural plan and process flow diagram of a hybrid telecom-network structured image display and projection system 100 including a pixel generator 105, a pixel aggregator 110, a pixel distribution subsystem 115, a pixel scaling subsystem 120 and a human visual system output 125. The image generating stage includes pixel generator 105, having a collection of DIPPs. The primitive generating stage may include pixel aggregator 110, pixel distribution subsystem 115, and/or pixel scaling subsystem 120. The process outlines a decision path for determining the fabrication parameters for different display categories. Example input parameters include, but are not limited to, size of display output, number and types of image engines, distance from image engine to output surface, pixel resolution, and optical fiber properties (e.g., diameter, bend radius, and the like.). The process may be described as follows One or more image generating devices 130 through 135 generate an image using pixel generators 105. Pixel generator 105 includes a device with an array of pixels (DIPPs) whose on-off state of transmitting\reflecting light together form a pattern which either is an image recognized by the human visual system or spatial information from which an image is later formed by another device or process.

From each individual pixel (DIPP), the light (the image constituent signal when the pixel is on) is coupled into a light-guiding element (an input stage of a primitive generating stage), preferably an optical fiber and aggregated together producing an arrangement 140 using pixel aggregator 110. This aggregation 145 also serves as one embodiment of pixel distribution subsystem 115 (a distribution stage of a primitive generating stage) that splits available pixel signals (image constituent signals) into batches between multiple final output devices for viewing. To reconcile the dimensions of pixel generator 105 with final image output, pixel scaling is implemented in the device 150 through 160 making up pixel scaling subsystem 120. Arrangement 140 provides an appropriate angle of dispersion that is required for direct view flat panel 155 and projection applications 165.

It is important to note that pixel generator 105 may be a square shape, or a rectangle whose sides are in a typical display aspect ratio of 4:3, but also may be in the form of long strips or other shapes and structures that may be advantageous to working in cooperation with the fiberoptic output optics structures. Some image generating devices, such as an array of planar Mach-Zehnder devices, may be easier to fabricate in strip form. While not as applicable to the simpler form of telecom network-structure display system, and more applicable to a signal aggregation version disclosed elsewhere herein, an important point is that the image generating structure may be of many shapes and sizes.

A fused fiber array is preferred for collecting a matching array of fibers and bonding that array to the image generating surface, with the fiber's coupling core either the same size as, or smaller than, the active pixel area of a DIPP. Preferably, the core dimensions are the same as the active pixel area (typically square), and the fiber cladding or non-coupling region matches the fill-area between active pixel regions on the array (typically the fill area contains the addressing matrix of the image array, which separates each pixel (DIPP)).

The fused or bonded fiber array may be in fact an input end of an optical assembly whose output end is the display "face" for viewing by the HVS or image projection optics.

FIG. 2 is a block diagram of a very thin, scalable direct-view display 200. This illustrates one possible outcome of the present invention. The display output can be from a single light engine source powering a single display output or it can be weaved together in segments to display either one larger display powered by either a single or multiple light engines. The advantage of multiple image engines is that one can use a variety of technologies to achieve a best solution for a specific environment. In the case of multiple light engines it can also function as a large sectorized display with very little or no gaps in between sectors that displays several video feeds at one time.

In a textile-matte Jacquard loom assembly process and structure, optical fiber is structured in one of two ways: A) folded and bent fibers bound-in-place in an X-Y grid to provide pixel scaling and B) channel output aggregation based on systematic transposition of fiberoptic channels from many discrete sources to one array of matched meta-pixel outputs.

Folded and Bent Fibers "Bound-in-Place" in an X-Y Grid to Provide Pixel Scaling 1.1 Folded Fibers and Bent Aggregation of Fibers The optical fibers are separate (not fused or solid-bonded) after a length determined by the mechanical requirements of the fibers employed. They are mechanically held in place by an x-y grid structure (relative to the z-axis of the fibers), which is preferably fabricated by a 3D Jacquard looming process, as further detailed below.

A fused fiber array is preferred for collecting a matching array of fibers and bonding that array to the image generating surface, with the fiber's coupling core either the same size as, or smaller than, the active pixel area. Preferably, the core dimensions are the same as the active pixel area (typically square), and the fiber cladding or non-coupling region matches the fill-area between active pixel regions on the array (typically the fill area contains the addressing matrix of the image array, which separates each pixel).

The fused or bonded fiber array may be in fact an input end of an optical assembly whose output end is the display "face" for viewing by the HVS or image projection optics.

The ratio of the dimensions of the image generating device (or portion thereof to be addressed) and the image output face will determine the degree of distance between the fibers in a dispersed array.

To implement an extremely flat display, virtually all the optical fibers (except those addressing pixels may be immediately facing) are preferably bent at right angles or at close to right angles. Corning produces a commercially available photonic crystal fiber that will efficiently couple light while mechanically bent at right angles, (e.g., Corning ClearCurve™ Fiber).

After being immediately bent or bent a short distance (millimeters) from the point where the fiber array is fused and bonded to the image output surface, the fibers fan out at some angle (either parallel or, preferably, at a small relative angle to the plane of the output surface, that relative angle (compared to other fibers and pixels) as determined by the relative distance of the fiber from the position of the image generating device and output viewing surface of the display and the position of the pixel relative to other pixels on the image generating devices.

The optical fiber is bent again (preferably at right angles) at x-y coordinates that match the coordinates of the pixel to be addressed at the viewing output surface of the display or projection optics.

Structurally, the fibers, which must be angled or bent at least once from the image generation/fused fiber junction to be dispersed to the differently-scaled dimensions of the display viewing output surface, are mechanically held in place by a grid structure.

1.2 X-Y Grid "Bound-in-Place" Fibers

Woven displays have been proposed previously, but they have predominantly been woven displays with active electroluminescent x-y elements without sufficient optical path control for good viewing angle and efficient usage of light (loss to the surrounding matrix), and limited also by the inherent limitations of Electro-luminescent image generating technology (including OLED). If there are z-axis fibers or filaments (perpendicular to or "pointing to" or "addressing" the display output surface), they are only structural z axis fiber elements. Or, in the other known versions of woven displays (proposed by the same inventor of the present disclosure), they have had active z-axis elements where the fiber is a form of fiber-device performing a portion of the modulation process, specifically, a portion of a MO switch process.

Figure 3:
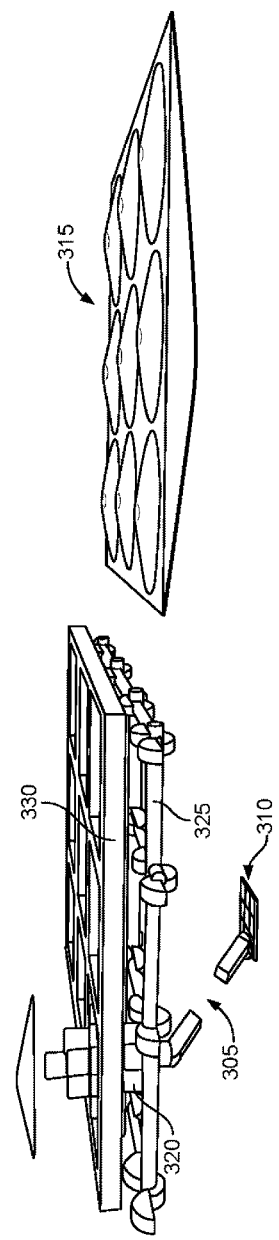
FIG. 3 is a detailed drawing of the inner components of the display output surface.

FIG. 3 is a detailed drawing of the display output surface. For the purpose of this disclosure, the Z axis is the active optical axis at the viewable display output surface 300. The guiding of the light through the weave is achieved by periodic, woven filaments "in-depth," from an input point of a textile-matrix structure 305 that couples one or more image generating device(s) 310 to a viewable display output surface 315. Aggregate fibers 320 in the z-axis provide a coupling system, while the x-y fiber/filaments, 325 and 330 are structural. A utility in the present pixel scaling method is at the output end of the overall textile-matte optics part.

In this embodiment, when viewed from above the plane of the display viewing output surface, the fibers (in a version where the image generating device sits at the relative center of the display viewing surface it addresses) appears similar to the interconnect fan-out from an IC chip to the PCB.

This grid structure may be of many forms for the simple version of this hybrid, telecom-network structured display system in which there is one pixel generating element for each pixel output element. Among those possible include the use of holey-sheets through which the fiber is inserted or "sewn" with a mechanical sewing-like operation.

But preferably, and a major object of this disclosure, is the use of a 3D Jacquard looming process that fixes into place these passive fibers at every point, making the fiber-optic array a unitary optical device. Fusion of the fibers (or bonding with an adhesive) is an option at a point where the fiber input array abuts an image generating device, and even in this instance, given a fill-factor between active pixel area, the fill-factor spacing may be implemented by a very fine x-y filament weave that holds the z-axis optical fibers in place, and thus affected without traditional fusing or epoxy bonding.

In a simple form, the optical fiber is purely a passive optics element, and bending of the fibers is introduced to implement an extremely thin display and, in general, providing for great flexibility in the positioning of the image generation device relative to the display viewing output surface.

In a Jacquard looming process, rows of x-axis, y-axis, and z-axis fibers or filaments are manipulated in a batch process, spatially transposed to form a 3D structure where x, y, and z filaments and fibers are alternated and adjacent in recurring patterns.

As is well-known from textiles manufacturing, complex patterns are implemented by a choice of filaments that (as in the case of a rug) are viewed in the z-axis, that is, protruding in the plane of the woven article (rug).

Different fibers (in the case of a rug, fibers of different color) may be disposed in the z-axis array, with potentially a unique fiber type at each X-Y coordinate, with the z-axis normal to the plane of the woven article. Where a dyed thread would be viewed in the surface of the rug, there would be a pixel in a display viewing output surface.

Figure 4:
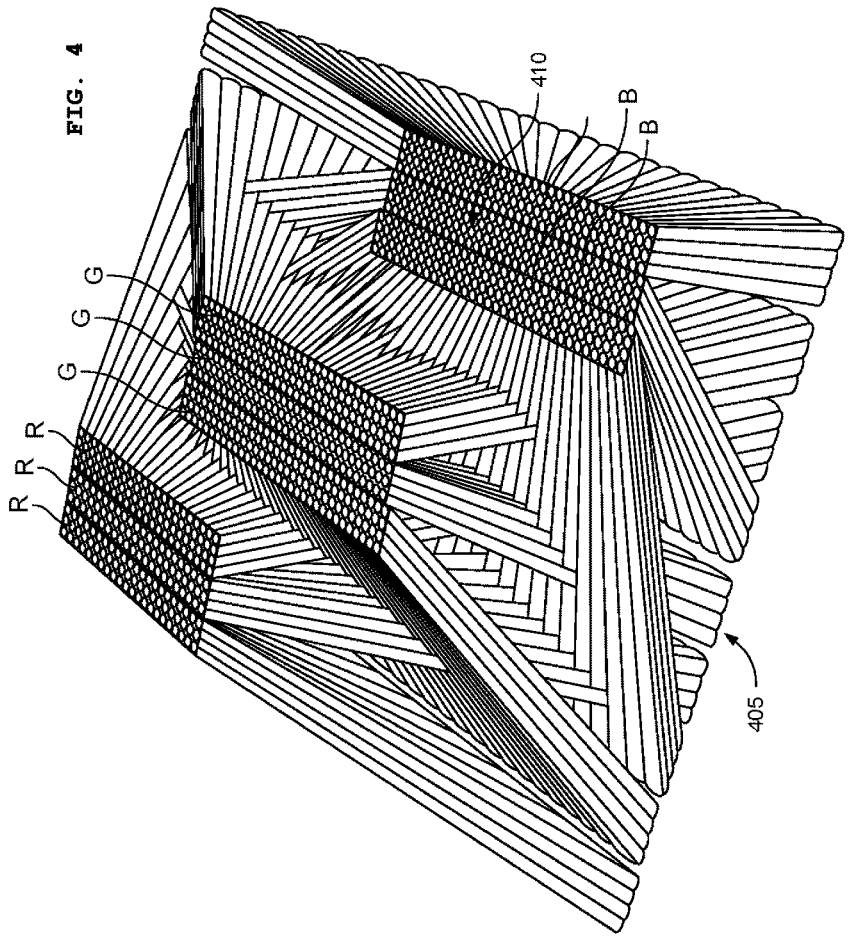
FIG. 4 is a diagram of a meta-cluster.

FIG. 4 is a diagram of a meta-cluster 400. Alternating clusters of three different filaments or fibers 400 (in this simple version of the present case, R, G, and B fibers), is a very simple implementation of what is a very flexible physical pattern generating process. The aggregation of light occurs by collection of light at the input surface 405 and redirection to bundles of the aggregated fibers at the output face 410. As the original Jacquard loom was a direct precursor of the modern computer, the output of the Jacquard loom may be viewed as the product of a physical computing/transpositional process.

Modern woven-composite manufacturing, from commercial suppliers such as Albany International Techniweave, is used to fabricate such precision-tolerance parts as aircraft engine turbine blades. Complex surfaces and shapes are achieved, with inter-penetrating elements, in a process that begins with a rapid virtual prototyping design phase implemented through CAD software. Sols may be infused into the woven matrix and cured, as one method of fabricating solid, defect-free parts exceeding the tolerances of any traditionally machined part.

Depending on a tightness of a weave and a choice of solutions that are injected into a woven matrix, a woven part may be rigid or flexible. The tensile strength of optical fiber, which (as in the example of the Corning fiber) is also extremely mechanically durable and resistant to transverse stresses, is alone sufficient to provide a self-structured display element needing no external framing or bracing, resulting in a very light weight device. A facing plate display glass is not required to implement a complete display structure. The display optics are part of a strong underlying structural part.

Combined with other fibers and filaments chosen only for mechanical and other characteristics, woven display structures with fiberoptic addressing are both functional and incredibly durable.

It is through this integrated design and fabrication process that the woven fiberoptic textile matte structure is fabricated. As with other parts fabricated in this process, the resulting output surface may be flat or implement a complex curved structure. A piece of furniture thus can be fabricated in which display output structure is implemented in the part. A car door or protective military tank plating may similarly be structured with display output capability.

Once fabricated as an integral, solid part, the input ends of the fibers, angled, bent or tapered (depending on desired geometry) and consolidated to meet at the face of the image generating device may be held in place by the woven elements (with or without infused and cured sol) or, as disclosed above, conventionally fused or epoxy solid-bonded.

1.3 Pixel Scaling Optics

While all other aspects of this simple hybrid display with woven fiberoptic faceplates have been disclosed, a component that remains to be disclosed is implementation of pixel-scaling at the output face.

In the present embodiment, the image generating device is smaller than the desired display output viewing face. For instance, a micro-display typically used in a cell phone may drive a woven, flexible, rollable display output surface the size of a laptop computer screen—for example, 15" diagonal. Pixel scaling reconciles the dimension of the optical fiber that abuts each pixel of the small display (2" dia.) (each individual subpixel or each RGB subpixel group) with the dimension of the much larger area viewable display surface and is the subject of the next section of the present disclosure.

In a simple, mechanical-optics scaling solution, an optical sheet with a cone shape or dispersion optics elements fabricated on the facing surface of the sheet couples the output light from the fiber and (in the case of the cone) disperses the light for (in effect) 100% fill factor, edge to edge, of the viewable display output surface.

Alternatively, in a commercially available method known to the art, the terminal point of the optical fiber itself is shaped in a taper or other lens design that provides for dispersion of light in a wide viewing angle.

Additionally, since the die shaping the optical fiber in the fiber drawing tower may be dynamically adjusted in the drawing process, the fiber dimensions may be calculated to increase so that the fiber end forms a sort of plug at the termination point, forming the output face. Fiber shape at the termination are preferably square-sided, or fabricated with another linear-sided polygon shape (e.g., hexagon) that may be threaded in the loom so that the fiber ends are "tiled" edge to edge at the output face (dies in series may be alternated—i.e., a circular die retracts and a die of another geometry is clamped for the fiber termination phase).

A combination of the variable fiber diameter and geometry and termination lens-shaping may be employed advantageously for superior viewing angle and image output.

Figure 5:
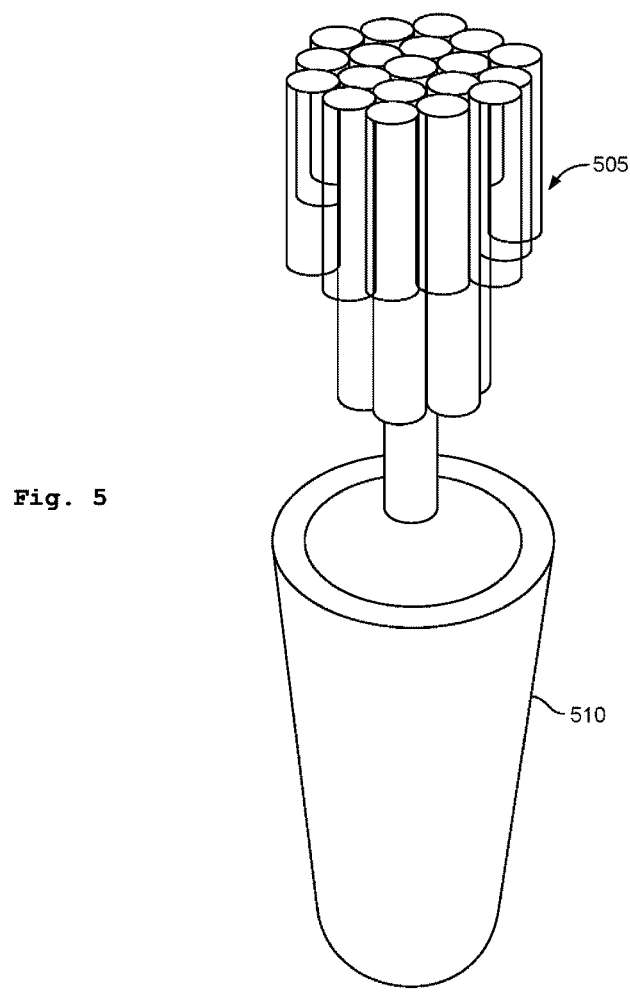
FIG. 5 is an illustration of pixel scaling.

FIG. 5 is an illustration of pixel scaling. Alternatively, and in a preferred embodiment 500, the output end of the fiber is stripped to its core, or is another form of "leaky" fiber at the output phase, that is then bundled 505 and surrounded by a reflecting fiber cone that could be a woven reflecting fiber cone 510. Here, the pixel-scaling is implemented by the woven structure itself.

For example, the surrounding structural filaments and fibers at the locus of the viewable output pixel may be woven into a depression. The structure is somewhat analogous to a stamen of a flower and the surrounding petals. The fibers and filaments themselves may be coated with a reflective material, or those immediately surrounding the pixel-fiber may be photonic crystal fibers (as with Oto-Beam™ and Beampath optical fibers available from Omniguide®, Inc.) designed to implement high reflectance through periodic structures in the dielectric medium inside each fiber.

It is well-known to the art that a common method of fabricating a photonic crystal fiber is by bundling a set of filaments of a particular size and geometry and fusing them such that gaps remain between the fused elements. The designing of the gap sizes is what implements the photonic bandgap, a periodic structure through which certain modes of light are "forbidden" to travel (determined by solution of Maxfield's equations for the structure in question).

Models that are commercially available and known to the art for calculating a photonic bandgap in a dielectric medium are used to similarly calculate an appropriate size, shape and periodicity of an array of fibers in a "meta-pixel" structure implemented in a woven matrix.

Optionally, a woven matrix may be heat-cured and thus implement a degree of fusing of filaments chosen for their relative melting temperature. Work at MIT on co-drawing disparate materials in a composite fiber has demonstrated examples of how composite materials may be chosen with respect to relative melt temperatures to form practical composite photonic crystal fibers with semiconducting and conducting elements in conjunction with the dielectrics.

In the present embodiment of pixel-scaling solution, a bared-core section of the fiber would protrude in a cone-like depression, surrounded by a woven reflecting fiber cone, and would be shaped to efficiently (using standard optical geometries) reflect the light that leaks from the bare-core fiber. A shallow depression and transparent filaments at the edges would provide for a wide angle of dispersion, both through geometry and refraction through the transparent edges of the edge-filaments.

Alternatively, instead of protruding in a concave depression in the display output surface, the bare core fiber may be surrounded by a woven cone or convex lens structure of transparent or PCF fiber to accept light leaking from the bare core and disperse it efficiently.

A variation on this approach would include burying a fiber that is not stripped to a bare core in a woven cone or lens structure that is chosen to disperse the more collimated light from the unstripped fiber.

Sols may be infused in the woven matrix, which would then be composed of reflective material at some locations, and black (light absorbant material) to enhance the tailoring of the light output from the display surface. The woven matrix may also be infused with colloidal solutions of nano-crystals, which additionally (by virtue of the optical properties of different sized nano-crystals and the differing energy states that result from the sizes) will fluoresce in response to input light. Phosphorous material may also be deposited on the output fiber structures. This emissive response can assist in not only optimizing the directionality of the output light for viewing angle, but augment the color quality of the light conducted from the original image generating source by the fiber optic textile-matrix structure.

In another variation of implementing optical output structures at least in part through the geometry of the woven matrix at the subpixel site, a depression is formed with the pixel fiber either unstripped and at the base of the depression, or stripped and protruding partially. The textile matrix is infused with a sol and cured, so that the depression is sealed.

Then a polymer or other liquid of appropriate density and viscosity is deposited or formed (by dipping in solution and removing or condensation) in the depression. Depending on the desired optical requirements, the clear material is designed (by composition and density) to cure to a specific lens shape. These methods of forming micro-lenses, as well as others, are well known to the art.

1.3.1 Single Image Engine

In a final variation and equally preferred, a single fiber abuts each RGB pixel group or one per subpixel, but it is (as an element of the textile-matrix fiberoptics) actually a central fiber of a first surrounding bundle of other fibers (wound, yarned or fused), themselves surrounded by a second additional bundle of fibers (wound, yarned or fused). The central fiber is a core-clad fiber only at the point of abutting the image generating pixel or subpixel, but is essentially stripped of the other surrounding fibers of which it is only the central fiber within all but the input portion of the textile-matrix fiberoptic structure.

The fiber is core-clad only where it is not surrounded by the other layers of fibers, thus for a length determined by the angle of separation between the core fibers as they geometrically disperse from the (relatively smaller) image generating device to the (relatively larger) viewable display output structure.

The reason for this is that, with the exception of a short overlap length where it is surrounded by the other layers of fiber, the core fiber is a "leaky" fiber or a bare core wrapped by the other two layers of fibers.

Except for the same overlap distance (required to insure no leakage) the innermost layer of wrapping fibers are themselves leaky (implemented by commercially available methods, including scoring or straining of fiber at periodic intervals), so that the light from the central core fiber that physically abutted the image generating pixel leaks into the first wrapping layer of other bare-core or leaky fibers. The second and final layer of fibers, which themselves may be infused or coated to insure optical coupling, form the optical coupling means of the fiber bundle of leaky core fibers. A spiral or wound structure adds additional strength and flexibility to the aggregate of fibers.

What is achieved thereby is a scalable "meta-fiber" and "meta-pixel," whose dimension is determined by the required size of the viewable display face output pixel. It is possible to progressively increase the dimension of the "meta-fiber" by a stepwise conversion of coupling an outer fiber wrap into a leaky fiber surrounded by an additional, new layer. (In the individual fiber fabrication process, this is a simple matter of sequential stripping-to-core or other "leaky feature fabrication" to implement fully-clad and leaky sections).

Fiber or filaments in this structure can be shaped with a geometry and sized as well to implement a bandgap structure, according to well-known and commercially available models for calculating PBG structures in dielectric structures.

For the purpose of tapering from the dimension of a viewable output face, this process of successive "peeling" enables a compact, final bundle of core-clad innermost fiber to terminate at an image-generating device. A cone-type termination point at the viewable output pixel ensures a wide viewing angle at the display face.

The embodiments described above are an example of a simple form of this new display system type, in which there is still a 1:1 correspondence between image generating pixel and viewable surface/projection optics output pixel.

In the following embodiment, a telecom-network paradigm is further exploited to decouple a reliance on a 1:1 relationship between image engine and viewable display structure and a 1:1 relationship between pixel "information" source and viewable pixel output.

1.3.2 Multiple Image Engines for Direct-View Displays

In the following embodiment, there remains a 1:1 relationship between the gross number of pixels switched at the image engine stage and the number of viewable output pixels, but (as indicated in the prior sections of this disclosure), that does not mean that only one individual image generating device is driving the entire viewable output array and every viewable pixel in that array.

Figure 6:
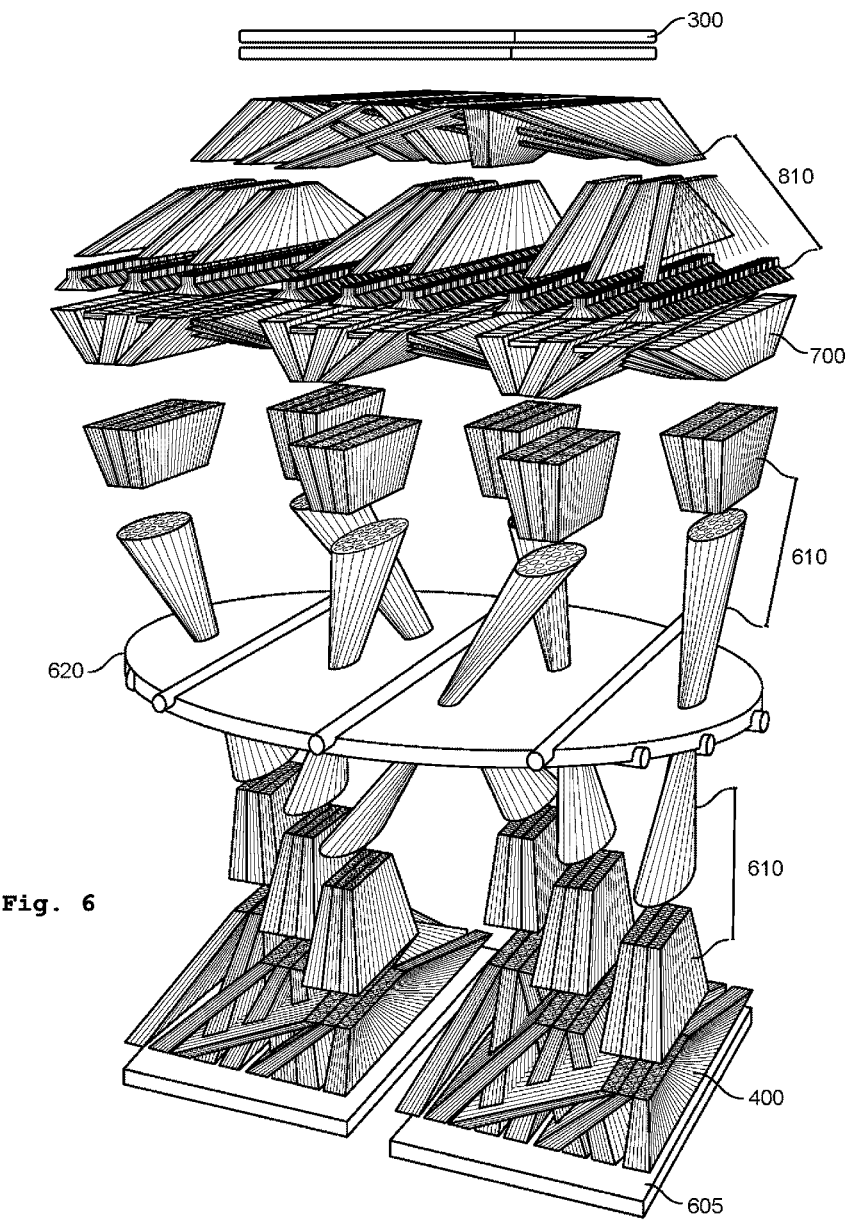
FIG. 6 is an illustration of multiple image engines powering a single display output surface.

FIG. 6 is an illustration of multiple image engines powering a single display output surface. An alternate preferred embodiment discloses an image display device in which multiple image generating devices "drive" a single viewable display area or portions of a total viewable display area 600.

In this alternate embodiment, the resolution of the driving image generating device may be the same as the image resolution of the viewable output display surface, or it may be of lesser resolution. There are in fact several versions and purposes to which the use of multiple image generating devices may be put:

Use of Multiple Lower-resolution Image Engines to Drive Sub-sectors of the Final Viewable Output Display Surface.

Use of Multiple Image Engines to Drive Duplicate Pixels of a Larger-Scale Final Viewable Output Surface Use of Multiple Image Engines to Implement Stereoscopic or Other Dimensional Display Types Via Differentiated Pixel Outputs Sub-Case 1 Embodiment Multiple Image Devices Driving Sectorized Display A typical version of this embodiment would find a large flat panel display, fabricated in the same Jacquard-loom fiberoptic textile-matrix method disclosed above. But it would differ from the simplest case in the prior embodiment in that instead of all the addressing optical fibers loomed and gathered in a "fan-out" from one (simplest case: central) smaller image generating device, forming in perspective a small, very flat pyramidal structure, would be gathered by the display sector (a subsection of the overall viewable display surface) into multiple pyramidal structures, edge-to-edge adjacent 200.

A 4:3 landscape flat panel display, then, might have 6 smaller (for instance, cell-phone type) displays, three for the top half, three for the bottom half, dividing the overall display into 6 sectors. In this example, the cell-phone type displays would be back-illuminated by a more powerful source then used in a cell phone, for instance, a more powerful LED module, such as those manufactured by Luminus.

The woven textile-matrix structure is treated as an integrated part where the optical fibers as textile elements are terminates at the display output surface (on the z-axis). In conjunction with the appropriate pixel scaling solution (see above), the optical fibers are folded or bent or curved to converge at the image generating device driving that sector (⅙ of the total display area). What this would appear to be is two rows of three pyramidal structures on the back side of the overall display 600.

The image generating device or devices 605 do not have to be a mirror dimension to the overall display, and do not have to be arranged parallel to the plane of the overall display. An arrangement where the image generating devices are facing and parallel to the plane of the overall viewable display surface is only a simple version of this scheme. Image generating devices can be arranged with their pixel plane perpendicular to the plane of the overall viewable display surface, or arranged to be at the edges of the overall display or even outside the plane of the overall display, to the side.

These variations in relative spatial arrangement of image-generating device and overall viewable output surface simply change the slope of the addressing optical fibers as they are woven and gathered from their output position through a guiding grid plan 620 to the overall viewable display surface 610 and 615. Instead of very flat, symmetrical pyramids, what would be viewed would be wedges whose thickness is greatest at the edge of the overall display and a minimum at the center of the display.

The image generating devices do not have to be of the same technology. Combinations of several different image generating devices can be used to harness the best in class of each for a final viewable output that is superior to any single image generating technology.

Alternatively, the image-generating devices can be fabricated as long strips, either parallel to the top or sides (or both) of the overall viewable display output surface. Various geometries for the image generating devices are possible, only requiring differences in the relative slopes of the addressing fibers, where they may be folded or bent or curved, and the overall topology of the fiberoptic textile-matrix part that forms the optics addressing structure of the display.

In a flexible display version of this embodiment, the driving-display strips would structurally be somewhat akin to widely-spaced "Venetian blind" slats, united by the overall textile fiberoptic display structure.

Sub-Case 2 Embodiment

Multiple Image Devices to Drive Duplicate Pixels in Larger Viewable Displays

In very large direct-view displays, as the ratio of the area of the viewable display surface and the size of the image generating device increases in magnitude, an auxiliary method for addressing the problem of upscaling pixels is to employ duplicate image generating devices via 300 to drive duplicate pixels, forming "meta-pixels" in large scale displays composed of multiple optical fibers or meta-fibers as shown in 500.

Thus, a relatively smaller image-generating device that is a driver of a larger-area display may have greater native resolution than the larger viewable display and use that native resolution to drive duplicate pixels (pixels in groups with the same image information or on-off state). i.e., a 4 k compact image generating device driving an HD or 2 k viewable display has 4×HD of pixel capacity. Those extra pixels would simply send the same pixel information down 4 optical fibers or meta-fiber cluster.

Alternatively, multiple image generating devices driving different sectors may divide their native resolution by some integer by using multiple generating pixels to generate duplicate pixel information down multiple fibers. Thus, an image generating device with native HD resolution may use that native resolution to output HD/4 actual unique picture information/resolution, sending the same pixel state information down groups of 4 fibers. To supply aggregate HD picture information to the overall viewable display structure, this example, would require 4 HD-native image generating devices driving 4 edge-to-edge sectors of the overall viewable display surface.

2. Channel (pixel) Output Aggregation Based on Systematic Transposition of Fiberoptic Channels from Many Discrete Sources to One Array of Matched Meta-Pixel Outputs To fully realize the potential of the telecom network-structured image display and projection system, in which the display is treated as a photonic or opto-electronic network leveraging the relative strengths of a wide range of techniques and components of optical switching (fiber-chip, fiber-device, and PIC), there is a need to treat the color state of an image display pixel as a final "signal" whose composition may be composed of multiple signal sources from a variety of devices and modulation techniques.

A basic building block of this generalized architecture is found in a more complex utilization of the physical Jacquard loom fabrication system. Through a systematic transpositional assembly model, fiberoptic channels are sorted, aggregated, and grouped, combining discrete channel sources from disparate elements into integrated output assemblies. The solid textile-matte optics structure may thus be viewed as a physical transform matrix.

Figure 7:
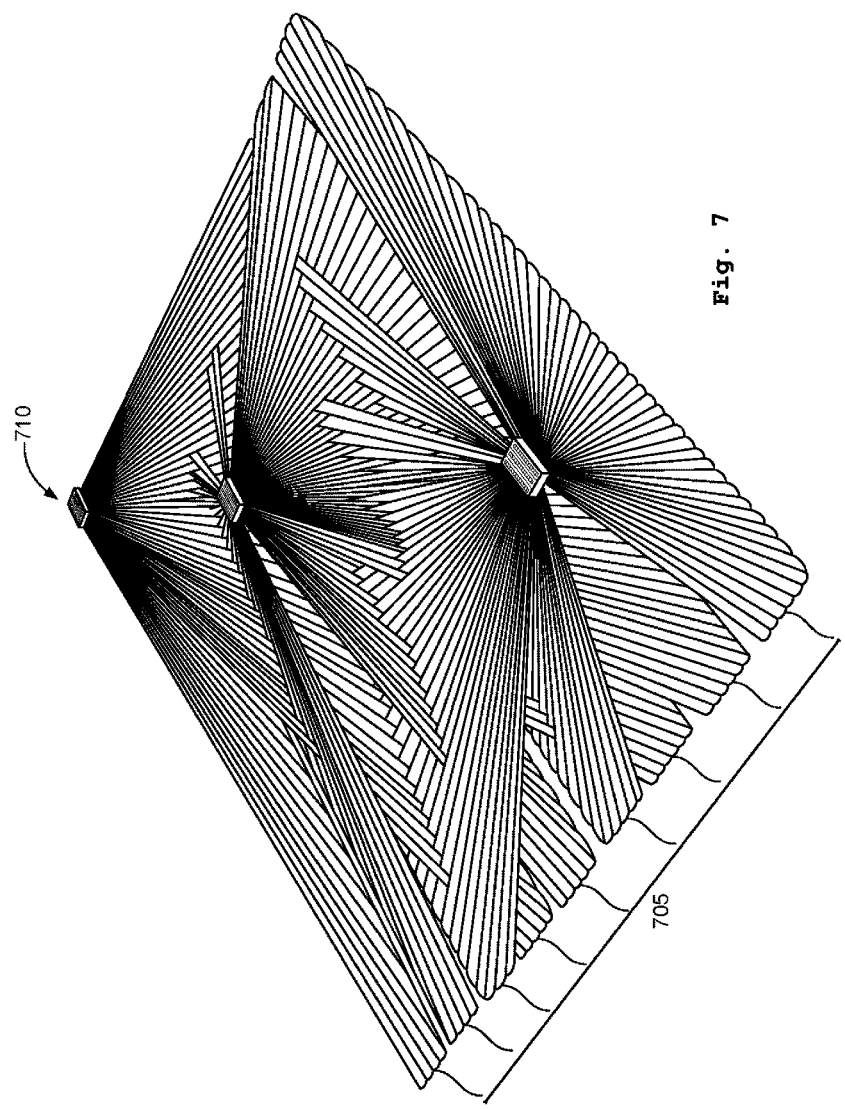
FIG. 7 is an illustration of aggregation of intensity for further distribution to the display output surface.

FIG. 7 is an illustration of aggregation of intensity for further distribution to the display output surface. In a simple version of the channel aggregation 700, differing subpixels originate from different image generating devices 705. In any given color or image information display system of N elements 710 where each element 710 originates from a different, specialized and independent image-generating device 705 (a set of three monochrome RGB devices, for instance), with an RGB 3-subpixel system being a system of 3 picture information elements 710, optical fibers disposed in the general Z-axis with respect to an x-y textile gridding structure (defining the viewable output surface and holding the z-axis fibers separate and in position), are arranged in unique sets of N rows. See FIG. 8.

Whether arranged in diagonal clusters or compact symmetric groupings (a display system of 3 elements would symmetrically be arranged in a triangle or chevron pattern, with two elements in one column and one element in an adjacent column), each element occupies a separate row. In an HD resolution display system of 2 k×1 k pixels, alternating sets of R, G and B rows have 2000 optical fibers (or meta-fibers) per color-subpixel row.

Figure 8:
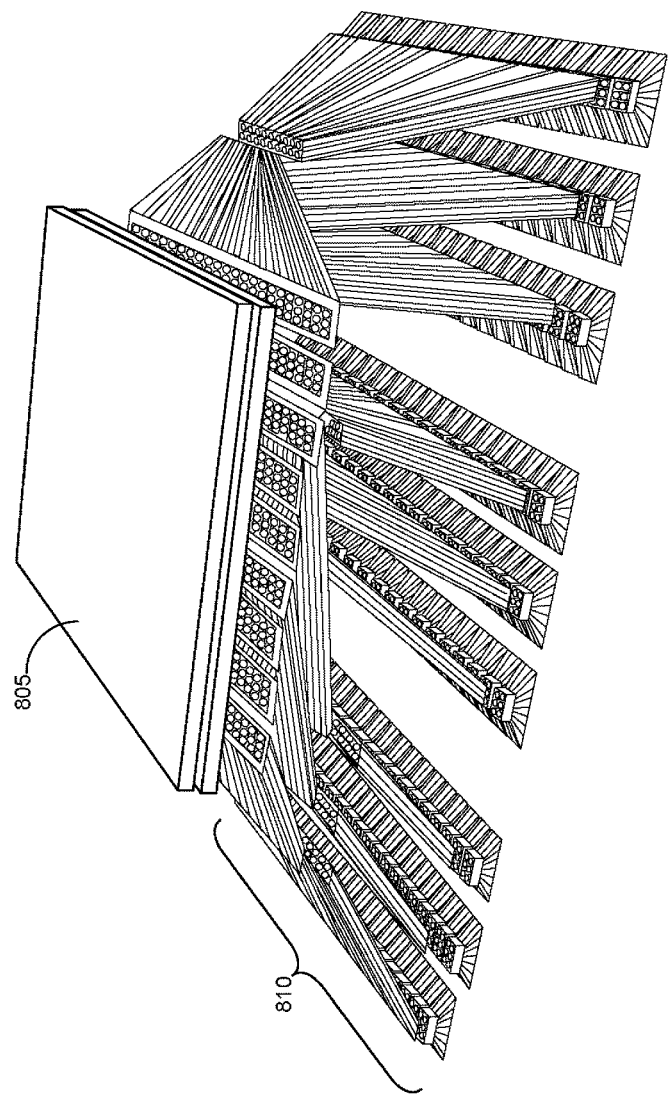
FIG. 8 is an illustration of the coupling of the aggregated intensity to the display output surface.

FIG. 8 is an illustration of the coupling of the aggregated intensity to the display output surface. In an RGB color subpixel system 800, there would be seen, as viewed in the plane of the display face 805, alternating sets of z-axis Red, Green and Blue Rows 810. At the viewable display output surface, all the Red rows (every third row of each set of RGB rows) would be held in the output face of the viewable display at the appropriate Red position of each RGB grouping.

But then, employing batch-operations manipulating entire rows at time in the weaving of x, y and z axis fibers or filaments, the red rows are then be separated systematically from their adjacent blue and green rows and subpixel clusters, and ultimately routed to a dedicated monochrome image generating device.

In one embodiment of a spatial transposition and sorting via batch looming operation, from the viewable output face, to segregate all the red fibers into one fiber bundle that would be routed to a monochrome Red image generating device, all the Red fibers are folded at a different distance from the viewable display face than the Green and the blue. Thus the red, green and blue fibers would fan out from the monochrome red image generating device each on their own plane, disposed at different distances from the viewable display face 805.

In another embodiment, where the fibers are bent and are routed at an angle to different monochrome image generating devices, in a simple version the Red rows (and fibers) are bent a short distance from the viewable surface and then angled to be gathered together at one side of the display backplane (forming what would be viewed as a half or a pyramid whose base is as wide as the entire viewable display face); the Green rows are gathered to the device at the center of the backplane (seen as a symmetrical pyramid whose base is again the entire width and height of the display face; and the blue rows are gathered to the side opposite the red, seen as a half-pyramid.

The pyramids appear to overlap, because while the overall textile-matrix fiberoptic backplane is one piece, the fibers (in the assembly process) have freedom of movement by row, and thus red fibers angle one way, passed by blue fibers angling the other way, and by the green fibers angling still another way.

Because entire alternating RGB rows are separate from each other and have freedom of movement in batch weaving operations, the fibers are free to angle away from the display face to be gathered and then butted to monochrome image generating devices arranged in whatever way is most efficient for the overall display system packaging (see prior discussion of options in spatial orientation and geometry of image generating devices).

As indicated previously, this method of systematic grouping, segregation and aggregation of pixel channels is applicable to any generalized system of N pixels. Thus, this can be extended to meta-pixel groupings of spatially-differentiated pixel sets as well as to simple RGB systems of 3 elements, to implement dimensional (stereoscopic, holographic) displays, as referenced in a prior section of this overall disclosure.

In any case, sets of fiber providing display information are grouped in the viewable display face, then by segregating output types by rows and batch-manipulating the rows in a loom frame and arranging them to be separated from their display-face groupings and to then be aggregated by type so that they may be butted to specialized image generating devices.

To allow use and implementation of the widest possible array of optical modulation technologies, as well as use of image generating devices that individually may be relatively slow-switching, temperature-sensitive and thus limited in optical load, and spectral-band limited at the device level, a method is required to aggregate multiple signal sources and combining them in a single integrated channel (fiber or meta-fiber).

Such an objective is implemented by the same method as specified above for affecting a spatial transform of fibers issuing from N discrete devices which then need to be de-segregated and grouped in recurring sets of N fibers in a display output matrix.

There are a variety of applications for which this type of solution is immediately and obviously beneficial.

For instance, this is a practical need for hi-brightness image display or projection systems, or hi-speed display or projection systems, in which a hi-performance total system may be achieved by using multiple image generating devices that alone can not efficiently pass enough light or can not process enough frames per second, but by combining their output into a final single channel (for instance, in a 20 k lumen digital cinema projection application) sufficient lumens may be aggregated, and frames from separate image generators interleaved, to achieve a hi-brightness, fast-switching system. Thus from basic componentry that cannot handle or pass bright light nor generate sufficient frames per second for applications such as stereoscopic or holographic display or projection, a digital cinema projection system or extremely large (viz., wall-sized), hi-performance direct view display may be achieved.

Other light modulator methods, such as Mach-Zehnder switches and other planar modulation switches in photonics that modulate coherent, narrow band light may benefit from the signal aggregation method as well, and make them practical for display applications that they would otherwise be unsuited for.

Some switch types cannot handle the input intensity, nor pass sufficient light without boosting in the modulation process. In addition, coherent narrow laser light is not safe for the HVS in certain display applications, which would thus (with the benefit of the present disclosure) make impractical most if any display applications for these types of modulators.

Multiple, individually narrow bands may be aggregated from differently optimized switch arrays, bands can be passed through fiber designed to allow bandwidth to grow and coherence to be broken down. Sufficient intensity can be aggregated to support large, bright image areas, whether direct-view (especially in daylight) or projected.

For the purpose of signal aggregation, once signal is aggregated from separate sources grouped in sets of fibers to ultimately supply a unified meta-pixel, there must be a means of mixing the signals from the grouped fibers.

In aggregating signals, familiar devices from telecommunications where multiple fibers insert signals that are combined and then routed into a single output fiber are options for this purpose (routers, circulators, ring resonators, and the like).

But preferably, the signal aggregation employs the methods disclosed previously for the formation of meta-pixels. In large area, bright direct-view displays, physically scaling down from a set of input fibers to one output fiber is not required; leaky fibers may be those cases involving described and coupled through index or photonic crystal structures surrounding them, without scaling down to a smaller end-pixel dimension. Upscaling to even larger output pixels is possible using the methods previously disclosed.

By contrast to a larger direct-view display, in a projection application that benefits from this method, the output optics of the projection system will generally be of much smaller size than the aggregate size (or even individual size) of the image generating devices whose output is aggregated.

The down-scaling requirement for projection systems employing the signal aggregation solution may be viewed as the inverse of the pixel up-scaling requirement of a smaller image engine directly addressing, through the fiber, a larger-area direct view display.

The methods of combining light are essentially the same, however, as in upscaling—leaky fibers combined together with a core fiber—with the core fiber in this case serving as the output fiber, rather than input fiber, surrounded by a coupling sleeve as shown in 400.

The direction of light, therefore, is opposite in a projection application with down-scaling vs. a large-area direct-view system with pixel upscaling: in upscaling, there is a single input fiber that is stripped to its core, or is a leaky fiber, while surrounded with other leaky fibers or optics that accept the leaked light of the single fiber and convey the light through the now larger-dimensioned meta-fiber.

At all times, coatings and sols with nano-crystals or bulk reflective material may be advantageously utilized so as to limit back-reflections in either the upscaling or downscaling structures, using the meta-fiber approach.

When downscaling, the direction of light and process flow is from a larger group of fibers into a central leaky or stripped-core fiber, or structured in a woven textile optic that terminates in a single fiber that when past this exchange or coupling stage is the sole carrier of the hi-intensity signal.

Alternatively, other commercial and well-known optics or photonic or opto-electronic devices may be employed, whereby multiple fibers are inserted separately or in a bundle into an optical structure or interconnect device that (simple versions are a cone or lens) couples or focuses the combined signal into the output fiber. A wide range of methods are well-known to the art, previously referenced, and may be selected as options for the overall system.

Overall, then, the macro-operation of a projection system can be viewed as the inverse of the structures described for the cases in which a smaller image generating engine drives a larger viewable output display. In a projection system, what is the input end of the direct-view system, a bundle of (in simplest form) RGB fibers, is the output optics of a projection system.

The output optics, then, which preferably in a projection system is a fused-fiber array of RGB fibers which have aggregated light and frames from multiple (cheap but temperature sensitive, slow image engines), dispenses with the need for prism optics to combine light from separate RGB image engines.

The process of aggregation can be repeated in multiple steps. Image engines can be combined to aggregate enough light for, say, the net blue subpixel array, as well as to deliver sufficient number of frames per second, and dimensionally-differentiated channels as well.

2.1 Embodiment

Image Server Architecture for Digital Cinema

An "image server" architecture, derived from telecom network architectures, follows, in which multiple, cheap image generation panels, for example LCD panels using efficient LED illumination modules (ref Luminus), which may be easily field-replaceable, aggregates to fiber bundles sufficient illumination per frame, and enough frames per second, and essentially infinitely scalable resolution.

For each final color output channel, many cheap image generators may be employed, each generating/passing a portion of the light needed to illuminate a giant screen, and/or each generating a portion of the frames needed to support strainless-stereoscopic or hi-response holographically-projected images. It is the fiberoptic textile-matrix network parts that achieve the aggregation and integration of source signal.

What is enabled is this: 16 k of stereoscopic image projection, at 60 fps per eye, using single mode PCF fiber in a fused RGB array passing the final image to the outboard projector optics (one fiber per color channel is all that is necessary, as the separate R, G and B channels can be downscaled and inserted into a final single pixel fiber for the final output).

Any other image-generating units and display types may be employed in an "image server" architecture, including FLCoS, OLED, MOD, DMD, MEMS, Mach-Zehnder, and the like.

Image-blades would be field replaceable and upgradeable, with telecom-derived opto-mechanical alignment and testing systems in place on each blade-slot. With segregated pixels per fiberoptic channel, testing for alignment is easily performed by digital network back-scatter detection, thus making alignment of optics much easier than in bulk optics.

2.2 Embodiment

Image Server Distribution Architecture for the Home, Business and Theaters

In a simple example of a telecom network-structured image distribution and display/projection system for the home, a set of one or more image servers of aggregate 4 k×2 k picture information density can be employed, with sufficient variable illumination means to deliver picture to 4 HD-resolution fiberoptic textile-matrix viewable display surfaces.

As optical fiber to and within the home is deployed worldwide, the opportunity to treat image display and projection needs in this flex-capacity and networked manner will mean significant savings to the buyer of display and projection equipment for the home.

Upgradeable image servers can be inserted in a central "rack" for the home, expanding capacity of the home image network. Fiberoptic textile-matrix display surfaces (of infinitely variable shapes and sizes) may be fabricated with native fiber resolution beyond what the HVS can differentiate, but in the cases of lower resolution structures, like a relatively inexpensive passive fixture, they can be replaced as needed.

As new and better modulation technologies are developed, the telecom network-structured system is the constant and can take advantage of cheaper, faster and brighter modulation and illumination technologies and modules.

But the opportunities for centralized image-server architecture for theaters, hotel guest rooms, and public entertainment spaces should be equally apparent.

Instead of buying standalone devices for each auditorium, or for each guestroom, or at each point in public space where image display is needed, fiberoptic textile-matrix fixtures may be located to tap into the fiberoptic distribution system.

As in the home model, the image-server distribution and display/projection architecture provides for expandable capacity and upgradeability.

The image-server distribution model, in a information display intensive world, is equally applicable to non-entertainment business and industrial applications.

In sum, the telecom network-structured image display and projection system model inherently provides an improved solution as compared to mono-technology displays, by leveraging best-in-breed light-networking and modulation components for each stage of the image generation and distribution process.

While the benefits are immediate for a standalone display or projection system, the advantages are increased significantly when the network model is implemented on a build-wide scale, with centralized illumination means, modulation modules, and multiple final direct-view and projection optics fixtures at any location in the building where fiberoptic hookup is provided. Automatic lock-alignment mechanisms at hookup locations will make technician assistance unnecessary, especially as known methods of routing complete images down optical fiber are optimized and implemented and discrete fiber pixels themselves become less necessary (this variant is in effect the ultimate pixel downscaling).

Whether implemented in a rollable or folded and deployable or inflatable fiberoptic display matrix for handheld and wearable applications, or in the form of view-through augmented reality glasses, or as building-wide image distribution systems, the network-structured display system can be adapted to any display requirement and provide the inherent benefit of its photonic "division-of-labor" model to that need.

A hybrid display-centric world may be envisioned, where the flexible portable screen driven by portable microdisplay "unplugs" when at home or work and unfolds at maximum size for comfortable work or entertainment applications with the central building image server taking over the job of delivering image content to the screen that was seconds ago driven by the billfold-size laptop-capacity personal media-computer device.

While the above description focuses on a preferred embodiment for an image display and projector system/method, the present invention may be extended to other applications, systems, and methods.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. An apparatus producing an output, comprising:
a signal generation stage including a plurality N of signal generators, each said signal generator spaced apart from each other signal generator and configured to generate a constituent signal; and
a signal processing system, coupled to said signal generation stage, including an input stage having a plurality M input channels extending from a first end to a second end with each input channel optically isolated from each other input channel and having an input at said first end and an output at said second end, wherein said plurality M equals said plurality N and wherein said plurality M inputs are coupled one-to-one respectively to said plurality N signal generators with each respective input receiving said constituent signal only from said coupled respective signal generator; and
wherein said signal processing system further includes a distribution stage having a plurality P distribution channels extending from a third end to a fourth end with each distribution channel having an input at said third end and an output at said fourth end, wherein P is less than M, wherein each particular input of said plurality P distribution channels is optically coupled to two or more particular outputs of said input stage configured to superimpose each constituent signal from said particular outputs into said particular distribution channel, and wherein each said output of said input stage is optically coupled to only one input of said distribution stage with the output available at said plurality P outputs of said distribution stage;
wherein said plurality P of distribution channels include a plurality of textile-method woven fiber optic elements.

2. An apparatus producing an output, comprising:
an signal generation stage including a plurality N of signal generators, each said signal generator spaced apart from each other signal generator and configured to generate a constituent signal; and
a signal processing system, coupled to said signal generation stage, including an input stage having a plurality M input channels extending from a first end to a second end with each input channel optically isolated from each other input channel and having an input at said first end and an output at said second end, wherein said plurality M equals said plurality N and wherein said plurality M inputs are coupled one-to-one respectively to said plurality N signal generators with each respective input receiving said constituent signal only from said coupled respective signal generator; and
wherein said signal processing system further includes a distribution stage having a plurality P distribution channels extending from a third end to a fourth end with each distribution channel having an input at said third end and an output at said fourth end, wherein P is less than M, wherein each particular input of said plurality P distribution channels is optically coupled to two or more particular outputs of said input stage configured to superimpose each constituent signal from said particular outputs into said particular distribution channel, and;
wherein each said output of said input stage is optically coupled to only one input of said distribution stage with the output available at said plurality P outputs of said distribution stage; wherein one or more of said plurality P of distribution channels are selected from the group consisting of a rollable optical guiding channel, a foldable optical guiding channel, a bendable optical guiding channel, a flexible optical guiding channel, and combinations thereof; wherein said plurality P of distribution channels include a textile weave structure.

* * * * *